(12) United States Patent
Engber et al.

(10) Patent No.: US 7,900,215 B2
(45) Date of Patent: Mar. 1, 2011

(54) METHOD AND APPARATUS FOR PROVIDING INTER-APPLICATION ACCESSIBILITY

(75) Inventors: Michael Scott Engber, Santa Clara, CA (US); Guyerik B. Fullerton, San Jose, CA (US); John Owen Louch, San Luis Obispo, CA (US); Kevin Bartlett Aitken, Cupertino, CA (US); Ali Ozer, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 215 days.

(21) Appl. No.: 12/253,185

(22) Filed: Oct. 16, 2008

(65) Prior Publication Data

US 2009/0055843 A1 Feb. 26, 2009

Related U.S. Application Data

(63) Continuation of application No. 10/431,424, filed on May 6, 2003, now Pat. No. 7,448,042.

(51) Int. Cl.
*G06F 13/00* (2006.01)

(52) U.S. Cl. ............................ 719/329; 719/310; 718/100

(58) Field of Classification Search .................. 719/310, 719/329; 718/100
See application file for complete search history.

(56) References Cited

U.S. PATENT DOCUMENTS

| | | | |
|---|---|---|---|
| 6,334,157 B1 * | 12/2001 | Oppermann et al. | ......... 719/310 |
| 6,952,675 B1 | 10/2005 | Tahara et al. | |
| 7,028,306 B2 | 4/2006 | Boloker et al. | |
| 7,194,411 B2 | 3/2007 | Slotznick et al. | |
| 7,249,369 B2 | 7/2007 | Knouse et al. | |
| 7,752,335 B2 * | 7/2010 | Boxenhorn | ................... 709/246 |

OTHER PUBLICATIONS

ActiveState, ActiveTcl User Guide, "Incr Tk", ActiveTcl 8.4.1.0, Nov. 6, 2002.
Microsoft Corporation, "Micrsoft Active Accessibility", Aug. 2001.
Rob Sinclair, "Microsoft Active Accessibility: Architecture", Microsoft Corporation, May 2000.
Rob Sinclair, "Microsoft Active Accessibility Architecture: Part 2", Microsoft Corporation, Jul. 2000.
Dmitri Klementiev, "Software Driving Software: Active Accessibility-Compliant Apps Give Programmers New Tools to Manipulate Software", MSDN Magazine, Apr. 2000.
Marc Abrams, "Device Independent Authoring with UIML", uiml. org, Oct. 2000.

* cited by examiner

*Primary Examiner* — Andy Ho
(74) *Attorney, Agent, or Firm* — Blakely, Sokoloff, Taylor & Zafman LLP

(57) ABSTRACT

Methods and apparatuses for providing inter-application accessibility. Embodiments of the present invention provide a framework independent, introspective, extensible technique for describing and interacting with interfaces across application processes, in which an accessibility client dynamically discovers aspects of an element (e.g., a User Interface (UI) element) by asking for its lists of actions and attributes. For example, an accessibility client application can have framework independent access to accessibility server applications written in different frameworks, such as Cocoa, Carbon, Java, or others. Since the lists of attributes and actions are introspected at run time, an accessibility client can be dynamically extensible to handle new attributes and actions that are added to the accessibility server after the accessibility client is made. The accessibility servers have the flexibility to describe any aspect of an interface without limitation; and, the accessibility clients can interact with the accessibility servers (e.g., to perform actions) without a priori information about the interface element.

69 Claims, 12 Drawing Sheets

METHOD AND APPARATUS FOR PROVIDING INTER-APPLICATION ACCESSIBILITY

This application is a continuation of U.S. patent application Ser. No. 10/431,424, filed on May 6, 2003, now U.S. Pat. No. 7,448,042, issued on Nov. 4, 2008.

FIELD OF THE INVENTION

The invention relates to user interface, and more particularly to the inter-application accessibility of user interfaces.

BACKGROUND

Graphical User Interface (GUI) provides a user friendly communication interface between a user and a computer software program. However, a typical "user friendly" graphical interface may not be particularly friendly to a user with special needs. Thus, specialized programs have been used to provide accessibility aids to help people use computers more effectively. For example, screen readers can be used for aiding people who have poor vision or who are blind; and, voice input utilities can be used for aiding people to use verbal commands to provide input to a computer program, which typically accepts inputs from a keyboard and/or a mouse. In additional to the accessibility aids, automated testing tools, computer-based training applications and others can also use the accessibility to control other application programs.

A conventional approach (e.g., Microsoft Active Accessibility) enables an accessibility client (e.g., an assistive program) to access the accessibility server (e.g., the target application that displays a GUI on a display screen) through a set of predefined attributes of user interface objects, such as name, role, state, location, parent and child count. The accessibility client discovers the relevant information about the user interface objects by obtaining the run time values of the set of predefined attributes; and, the accessibility server provides at the run time the values for the set of predefined attributes upon request.

SUMMARY OF THE DESCRIPTION

Methods and apparatuses for providing inter-application accessibility are described here. Some of the embodiments of the present invention are summarized in this section.

Embodiments of the present invention provide a framework independent, introspective, extensible technique for describing and interacting with interfaces across application processes, in which an accessibility client dynamically discovers aspects of an element (e.g., a User Interface (UI) element) by asking for its lists of actions and attributes. For example, an accessibility client application can have framework independent access to accessibility server applications written in different frameworks, such as Cocoa, Carbon, Java, or others. Since the lists of attributes and actions are introspected at run time, an accessibility client can be dynamically extensible to handle new attributes and actions that are added to the accessibility server after the accessibility client is made. The accessibility servers have the flexibility to describe any aspect of an interface without limitation; and, the accessibility clients can interact with the accessibility servers (e.g., to perform actions, to set attributes or a portion of an attribute, or to register and receive notifications of events) without a priori information about the interface element.

In one aspect of the present invention, a method for a first application process to access a user interface element, includes: obtaining, at the first application process, a representation of the user interface element; and retrieving, at the first application process and from a second application process, a list of attributes of the user interface element. In one example, the user interface element is a portion of the second application process; and, the first application retrieves a first value of a first attribute of the list of attributes of the user interface element. In one example, the first value is a portion of the value of the first attribute; and the portion is specified using one of: a) an index; and b) a range. In one example, the list of attributes includes at least one of: a) an attribute specifying a list of children of the user interface element; and b) an attribute specifying a parent of the user interface element. In one example, the first application process retrieves, from the second application process, an indication of whether the first attribute is settable or not; in response to a determination that the first attribute is settable, the first application process can request to set the first attribute to a second value. In one example, the first application process can request to set a portion of the first attribute to a second value in response to a determination that the first attribute is settable, where the portion is specified using one of: a) an index; and b) a range. In one example, the first application process retrieves from the second application process a list of actions applicable to the user interface element, and then, requests to perform an operation in the second application process, where the operation corresponds to a first action of the list of actions being applied to the user interface element.

In one aspect of the present invention, a method for a first application process to access a user interface element, includes: obtaining, at the first application process, a representation of the user interface element; and retrieving, at the first application process and from a second application process, a list of actions applicable to the user interface element. In one example, the user interface element is a portion of the second application process; and, the first application process requests to perform an operation in the second application process, where the operation corresponding to a first action of the list of actions being applied to the user interface element. In one example, the first application process further retrieves from the second application process a description of the first action. In one example, the second application process is determined from the representation of the user interface element. In one example, the representation of the user interface element is obtained at the first application process by specifying one of: a) a position on a display screen; b) an identification of the second application process; and c) an attribute of a user interface element.

In one aspect of the present invention, a method to provide accessibility includes: receiving, at a first application process, a request for a list of attributes of a first user interface element; communicating the request to a second application process; obtaining, at the second application process, the list of attributes of the first user interface element; and communicating the list of attributes from the second application process to the first application process. In one example, the first user interface element is a portion of the second application process. In one example, the method to provide accessibility further includes: receiving, at the first application process, a request for a value of a first attribute of the list of attributes of the first user interface element; communicating the request for a value of the first attribute of the first user interface element to the second application process; obtaining, at the second application process, a first value of the first attribute of the first user interface element; and communicating the first value from the second application process to the first application process. In one example, the first value includes a representation of a second user interface element; and obtaining the first value includes determining whether or not the second user interface element is to be presented to the first application process. In one example, the first value of the first attribute comprises one of: a) a representation of a parent of the first user interface element; and b) a representation of a child of the first user interface element. In one example, the method to provide accessibility further includes: receiving, at the first application process, a request for a portion of a value of a first attribute of the list of attributes of the first user interface element; communicating the request for the portion of the value of the first attribute of the first user interface element to the second application process; obtaining, at the second application process, the portion of the value of the first attribute of the first user interface element; and communicating the portion of the value from the second application process to the first application process, where the portion is specified using one of: a) an index; and b) a range. In one example, the method to provide accessibility further includes: receiving, at the first application process, a request for a list of actions applicable to the first user interface element; communicating the request for the list of actions to the second application process; obtaining, at the second application process, the list of actions applicable to the first user interface element; and communicating the list of actions from the second application process to the first application process. In one example, the method to provide accessibility further includes: receiving, at the first application process, a request to perform an operation in the second application process, the operation being specified by a first action of the list of actions; communicating the request to perform the operation that is specified by the first action; and causing the operation to be performed in the second application process.

In one aspect of the present invention, a method to provide accessibility includes: receiving, at a first application process, a request for a list of actions applicable to a user interface element; communicating the request for the list of actions to a second application process; obtaining, at the second application process, the list of actions applicable to the user interface element; and communicating the list of actions from the second application process to the first application process. In one example, the method to provide accessibility further includes: receiving, at the first application process, a request to perform an operation in the second application process, the operation being specified by a first action of the list of actions; communicating the request to perform the operation that is specified by the first action; and causing the operation to be performed in the second application process. In one example, the user interface element is a portion of the second application process. In one example, the second application process is determined from a representation of the user interface element at the first application process; the representation of the user interface element is obtained at the first application process by specifying one of: a) a position on a display screen; b) an identification of the second application process; and c) an attribute of a user interface element. In one example, the user interface element is determined from the representation; and, the operation is determined from the first action in the second application process.

The present invention includes methods and apparatuses which perform these methods, including data processing systems which perform these methods, and computer readable media which when executed on data processing systems cause the systems to perform these methods.

In one aspect of the present invention, a method for a first application process to access a second application process includes: obtaining, at the first application process, a representation of an element (e.g., an user interface element, a non-user interface element, or others) of the second application process; and retrieving, at the first application process and from the second application process, at least one of: a) a list of attributes of the element; and b) a list of actions applicable to the element. In one example, the list of attributes of the element includes at least one of: a) a children attribute specifying a list of representations of children elements of the element; and b) a parent attribute specifying a representation of parent element of the element; and, children attributes and parent attributes of representations of elements of the second application process link to form a hierarchy. In one example, the element is invisible to a user of the second application process through a user interface. In one example, the element includes audio information. In one example, from the first application process to the second application process, a request to perform a selected one of the list of the actions at the second application process is transmitted to invoke the action in the second application process from the first application process; and, similarly, a request for at least a portion of a value of a selected one of the list of the attributes of the element is transmitted for the first application to obtain further information about the element from the second application process.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
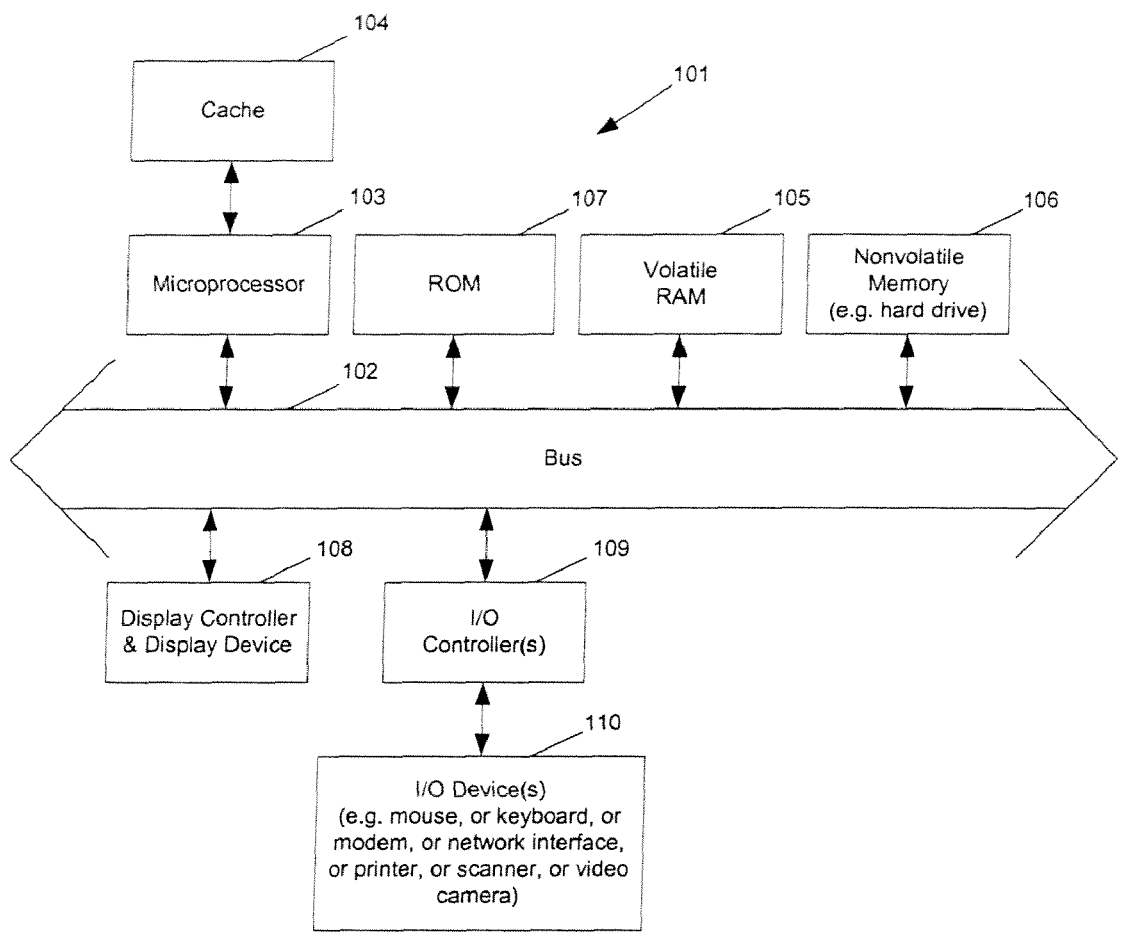
FIG. 1 shows a block diagram example of a data processing system which may be used with the present invention.

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to an or one embodiment in the present disclosure are not necessary to the same embodiment; and, such references means at least one.

At least one embodiment of the present invention seeks to provide a framework independent, introspective, extensible technique for describing and interacting with user interfaces across application processes. In one embodiment of the present invention, a client-side Application Program Interface (API) provides accessibility client applications with framework independent access to different accessibility server applications, which may be written using different user interface frameworks, such as Cocoa, Carbon, Java, or others.

In one embodiment of the present invention, an introspective approach is used for the accessibility client to dynamically discover aspects of a User Interface (UI) element by asking for its lists of actions and attributes. For example, once a window is discovered, it is not necessary to know a priori what attributes the window has and what actions the window responds to.

In one embodiment of the present invention, the accessibility client program is dynamically extensible so that it can handle new attributes and actions that are added to the accessibility server. An accessibility server application can have a new attribute or a new action that is not known at the time the accessibility client application is made without breaking the accessibility client application (e.g., an assistive application). Instead of working with only a well-known set of attributes and actions, the accessibility client can dynamically discover and work with the new attributes and actions.

In one embodiment of the present invention, the accessibility server program can provide descriptive information on any aspect of a user interface without limitation. The descriptive information can be provided in a flexible hierarchy and detail. For example, an accessibility server may provide access to the pixels in an image.

In one embodiment of the present invention, the accessibility client can interact with the accessibility server without a priori knowledge about the widgets used in the accessibility server. For example, the accessibility client can operate an accessibility server (e.g. push buttons, move sliders) without a priori knowledge about what actions that can be applied on a given type of user interface elements; and, the accessibility client can receive notifications of events (e.g. window appeared, slider value changed) occurred in a user interface element of the accessibility server.

The accessibility client applications according to various embodiments of the present invention include, but not limited to, assistive applications, user interface scripting, software tools for automated testing of user interfaces, and others.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems (e.g., a palm top device, or a cellular phone, or other) which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras and other devices which are well known in the art. Typically, the input output devices 110 are coupled to the system through input output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

A machine readable medium can be used to store software and data which when executed by a data processing system causes the system to perform various methods of the present invention. This executable software and data may be stored in various places including for example ROM 107, volatile RAM 105, non-volatile memory 106 and/or cache 104 as shown in FIG. 1. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.). For example, a machine readable medium includes recordable/non-recordable media (e.g., read only memory (ROM); random access memory (RAM); magnetic disk storage media; optical storage media; flash memory devices; etc.), as well as electrical, optical, acoustical or other forms of propagated signals (e.g., carrier waves, infrared signals, digital signals, etc.); etc.

In one embodiment of the present invention, the accessibility API is provided to allow an accessibility client application to interact with a target application (accessibility server) independent from the user interface framework used by the target application. For example, an accessibility application according to one embodiment of the present invention can use text-to-speech to read off the menus in the menu bar, then the items in one of the menus, and, finally, "pick" one of those items to be executed, independent on whether the menu bar is implemented in Java widgets, Cocoa widgets, Carbon widgets or others.

Figure 2:
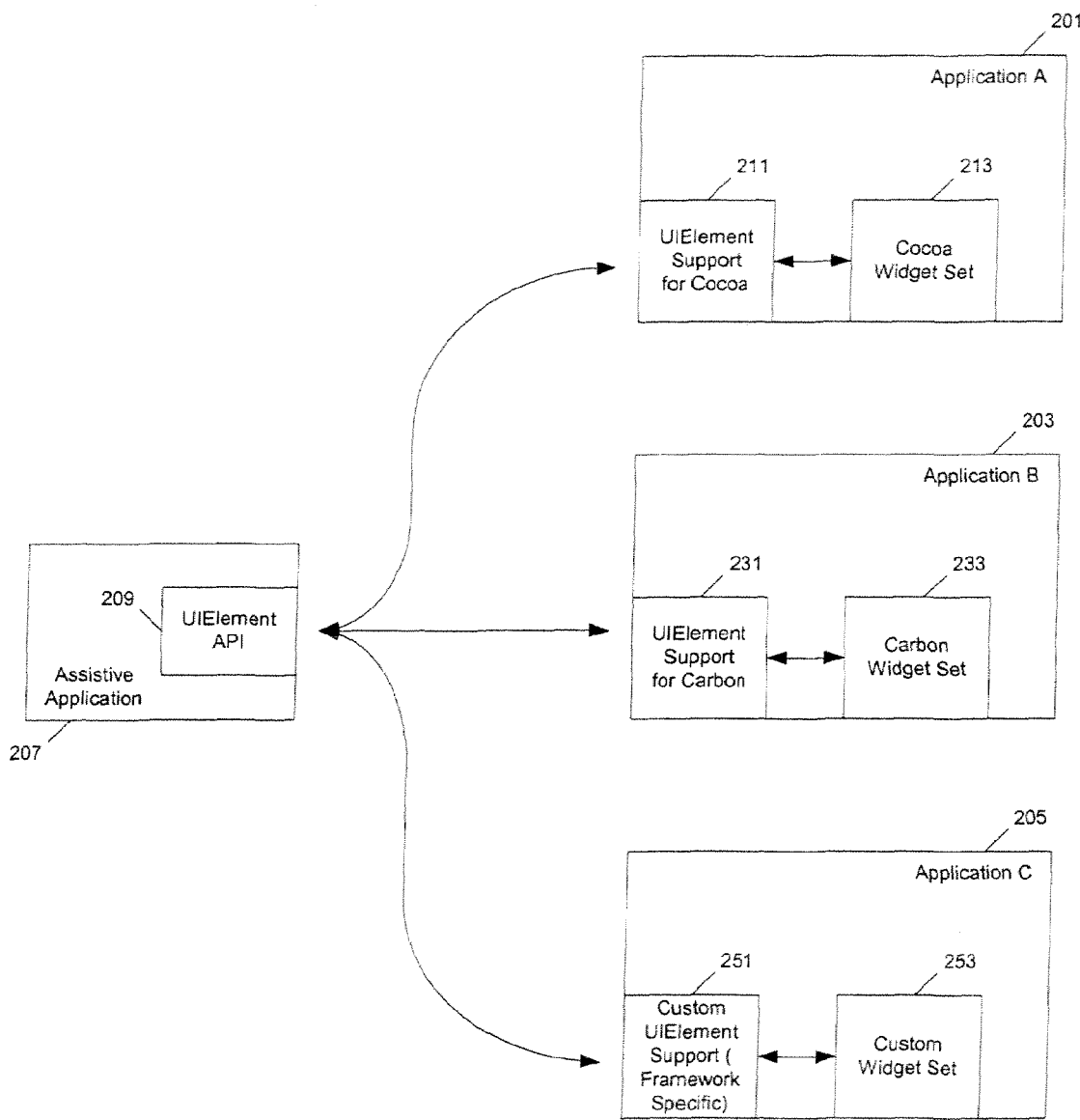
FIG. 2 illustrates a method to provide inter-application accessibility of user interfaces according to one embodiment of the present invention.

FIG. 2 illustrates a method to provide inter-application accessibility of user interfaces according to one embodiment of the present invention. According to one embodiment of the present invention, an accessibility client (e.g., assistive application 207) use client-side Application Program Interface (API) (e.g., API 209) to interact with accessibility servers of different frameworks, such as application 201 that uses Cocoa widget set 213, application 203 that uses Carbon widget set 233 and application 203 that uses custom widget set 253. Note that custom widgets are typically used with standard widgets of a well known framework, such as Carbon. Assistive application 207 contains no a priori information about the structure and behavior of the widget sets, which are framework dependent. Support layers 211, 231 and 251 facilitate the framework independent communication between assistive application 207 and the target applications (e.g., 201, 203, 205). For example, UIElement support for Cocoa 211 interacts with Cocoa widgets to provide information about the Cocoa widgets; and, UIElement support for Carbon 231 interacts with Carbon widgets to provide information about the Carbon widgets. Custom widget set 253 interacts custom UIElement support 251, which is framework specific in general, to provide accessibility (e.g., Cocoa based custom widgets use supports for Cocoa; and, Carbon based custom widgets use supports for Carbon). Thus, the communication between the assistive application and the target applications is encapsulated from the framework dependent details.

In one embodiment of the present invention, the accessibility server application uses a support API to exposes its user interface structure to the accessibility clients in a framework independent way. For example, the accessibility server can describe that it has a window on the screen; in the window are a button and a scroll view; and, inside the scroll view is text.

An application implemented in an object oriented approach typically has a natural way to represent the user interface structure in terms of user interface classes. For example, Cocoa provides NSWindow, NSView, NSControl, etc. An NSWindow object may contain an NSView object and an NSControl object. However, the class representation of the objects exposes a lot of details that are generally irrelevant to the accessibility client. For example, an object for the purpose of arranging the layout the objects it contains may not be of interest to an accessibility client in general. For example, an assistive application should not have to know that an NSWindow has a content view or that a radio cluster consists of a group of NSButtonCells, not NSButtons. Further, such class representations are framework dependent. For example, the details about NSWindow are Cocoa specific.

One embodiment of the present invention provides a common form of representation of the structure of user interface, which is framework independent. It can be used by Carbon applications as well Cocoa applications (or applications using other frameworks).

Figure 3:
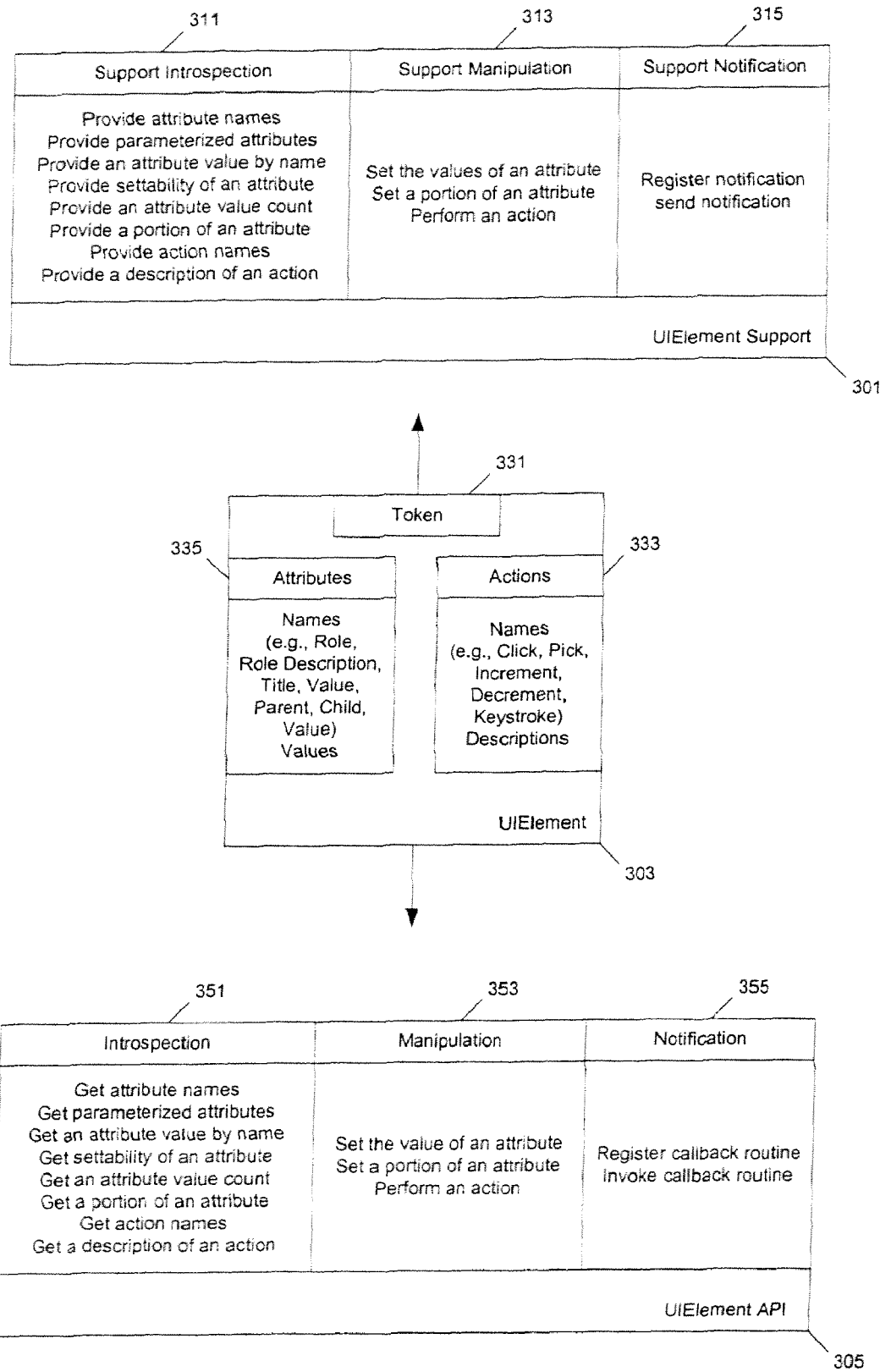
FIG. 3 illustrates a detailed method to provide inter-application accessibility of user interfaces according to one embodiment of the present invention.

FIG. 3 illustrates a detailed method to provide inter-application accessibility of user interfaces according to one embodiment of the present invention. In one embodiment of the present invention, a representation of UIElement, which represents a user interface element in the target application (accessibility server), is passed between UIElement API 305 for the accessibility client and UIElement Support 301 for the accessibility server to identify the user interface element. UIElement 303 contains token 331 which indicates the user interface element. Conceptually, UIElement 303 has attributes 335 and actions 333. However, the representation of UIElement 303 may not include the data for the attributes and actions. In one embodiment of the present invention, the information of the attributes and actions are obtained when needed from the user interface element that is represented by the UIElement. In another embodiment of the present invention, at least a portion of the information about the UIElement (e.g., the lists of attribute names and action names) are obtained and communicated to the UIElement API when a representation of the UIElement is first communicated to and maintained at the accessibility client, so that it is not necessary to contact the accessibility server subsequently for these information.

In one embodiment of the present invention, an accessibility client program communicates with UIElement API 305 to access the user interface objects in the target application. UIElement API 305 contains interfaces for introspection, manipulation and notification. For example, when in possess of a representation of UIElement 303, an accessibility client program can invoke the UIElement API to introspect or manipulate the user interface object represented by the UIElement and to receive notifications about events occurred in the user interface object. For example, the accessibility client program can get attribute names and action names of the UIElement 303. Thus, the accessibility client program does not have to know a priori the attributes and actions supported by a specific type of user interface objects. Further, a target application program may extend and incorporate attributes and actions that were not known at the time the accessibility client program was made. After obtaining the attribute names of the UIElement, the accessibility client program can retrieve the value of any of the attributes through the UIElement API by referring to the attribute name and the representation of the UIElement. Further, the accessibility client program can examine whether or not an attribute is settable. If the attribute is settable, the accessibility client program can set the attribute to a specified value. After obtaining the action names of the UIElement, the accessibility client program can cause an operation associated with an action to be performed through the user interface object represented by the UIElement by referring to the representation of the UIElement and the action name through the UIElement API. The accessibility client program can also register, through the UIElement API, a callback routine for an event associated with the user interface element that is represented by the UIElement; and, the callback routine is invoked when the target application notifies the occurrence of the registered event.

Certain attributes may have values in large data chunks. For example, a table view can have a large number of children. It is useful to operate (e.g., retrieve or set) on a portion of the value of the attribute. Thus, the attribute can be parameterized; and an index or an arrange can be used to specify a portion of the value. In one embodiment of the present invention, an accessibility client can get the list of the parameterized attributes; and, the accessibility client can obtain the size indicator of the data chunks of a parameterized attribute using the accessibility API and operate on a portion of the attribute (e.g., by specifying an index and a maximum number of counts of data chunks). In one embodiment of the present invention, the parameter is specified in an API function call with the name of the attribute as a single object, which can be an index, an index range, a text range (e.g., including line number and column number), a string specifying a selection criteria, or other types of parameters. For example, a "children" attribute may be parameterized so that the parameter "VISIBLE" is for the visible children and the parameter "ALL" is for all the children. In one embodiment of the present invention, some attributes have array values; and, API functions are provided for accessing a portion of the array values. In one embodiment of the present invention, the array of an attribute is retrieved from the accessibility server when the value of the attribute is requested; and, indices can then be used to access a portion of the array. In one embodiment of the present invention, only a portion of the value of a parameterized attribute is retrieved from the accessibility server when the attribute is requested with a parameter. It is understood that different indices correspond to different non-overlapping portions of a data value; and, different parameters (e.g., ranges) may correspond to different portions that have overlapping.

In one embodiment of the present invention, an accessibility server program uses UIElement support 301 to enable the objects of a specific user interface framework (e.g., java, Cocoa, Carbon) to exposes the structure of the user interface element in a framework independent fashion. The accessibility server generates a UIElement (e.g., 303) to represent a user interface object (e.g., an NSWindow object). In one embodiment, for each class of user interface objects, UIElement support 301 provides methods to support introspection, manipulation and notification. After a UIElement is generated at the accessibility server to represent the corresponding user interface object, UIElement support for the user interface object can provide attribute names and actions names when requested. The settability and the value of an attribute can be provided when the attribute is identified by the name of the attribute. Further, if the attribute is settable, the corresponding UIElement support provides access to set the attribute to a given value when the attribute is identified by the name of the attribute. Similarly, when an action is identified by the action name, the corresponding UIElement support causes the corresponding user interface element to perform the corresponding operation. Further, the UIElement support collects notification registrations and distributes notification when the corresponding events occur.

Note that the list of actions can alternatively be treated as an attribute; in such an embodiment, the "action" attribute is "performable", while some of the attributes are "settable."

In one embodiment of the present invention, the structure of the user interface structure is represented using a single class (e.g., UIElement) of objects. A UIElement object typically describes one user interface object; and, a hierarchy of UIElement objects describes the structure of a user interface. A UIElement object has attributes, such as "title" and "value." A UIElement object also describes actions that the user interface object responds to. A UIElement can contain other UIElements, which can be accessed through the "children" attribute of the UIElement.

For example, a menu can be represented as a UIElement which contains other UIElement, one for each item in the menu. The UIElements for the items can respond to the "pick" command or, in the case of submenus, can contain other UIElements. For example, a button object is responsive to action "press" and has attributes such as title, value, and others; a menu object is not responsive to any actions and has attributes such as title, children, and others; a menu item object is responsive to action "pick" and has attributes such as title, parent, and others; a slider object is responsive to actions "nudge left" and "nudge right" and has attributes such as value, min value, max value, and others.

In one embodiment of the present invention, an application itself is represented by a top-level UIElement. Its children are the menu bar and the windows. Starting from the application UIElement, one can access the entire hierarchy using the "children" attribute. Alternately, starting from any UIElement, one can work the way up the hierarchy using the "parent" attribute.

In one embodiment of the present invention, the attributes that a UIElement can have are not limited to a predetermined set of attributes. The list of attributes of a UIElement may vary depending on the type of user interface object represented by the UIElement. The list of attributes of the UIElement can be obtained at run time so that a priori knowledge about a type of user interface objects is not necessary.

In one embodiment of the present invention, some attributes of a UIElement can be changed. For example, changing the "value" attribute of a slider changes the slider's setting.

Below is a list of example UIElement attributes. Note that not all attributes are applicable to every kind of UIElement; and thus, not every UIElement has all these attributes. Further, new attributes can be added.

Role: A non-localized string that the accessibility application can use to identify the role of a UIElement (e.g. radioButton, checkBox, or others). Items that appear the same to an accessibility application (e.g., NSButton and NSButtonCell) can have the same role even though they correspond to different underlying classes of user interface elements.

Role Description: a localized string describing the UIElement (e.g., radio button, check box, or others).

Help: A localized string providing additional description (e.g., a button's tool tip).

Title: A localized string that adorns the UIElement (e.g., a menu's item's title, a text field's label, or others).

Value: A representation of the UIElement's state (e.g., on/off for a radio button, a text field's contents, or others). The type of data returned varies among the UIElements. This attribute is usually settable.

Minimum Value: The lower limit on a UIElement's value.
Maximum Value: The upper limit on a UIElement's value.
Enabled: Whether or not this UIElement is operable (e.g., a dimmed button is not enabled)
Focused: Whether or not this UIElement has the keyboard focus. If a UI Element can accept the keyboard focus, this attribute will be settable.
Parent: The UIElement containing this UIElement.
Children: A list of UIElements contained by this UIElement.

Selected Children: a list of selected children contained by this UIElement.

Position: The position of the UIElement's (e.g., relative to the top-left corner of the screen in screen coordinates).

Size: The size of the UIElement.

Window: the UIElement (if any) corresponding to the window containing this UIElement.

Selected Text: The currently selected text. This attribute is usually settable.

Selected Text Range: The range of the currently selected text (e.g., the start and the end character positions). This attribute is usually settable.

Key: Whether or not the window is where keystrokes are currently directed.

Main: Whether or not the window is frontmost, ignoring palettes and dialogs.

Miniaturized: Whether or not the window is miniaturized.

Menu Bar: The UIElement that corresponds to the menu bar.

Windows: A list of UIElement's for the application's windows.

Active: Whether or not the application is active.

Main Window: The UIElement representing the main window.

Key Window: The UIElement representing the key window.

Focused UIElement: The UIElement where keystrokes are currently directed.

Number of Characters: The total number of characters in a text UIElement.

Visible Character Range: The range of characters which are visible. This is a line-oriented attribute. It returns ranges for entire lines (e.g., characters that are horizontally clipped will be reported in the visible range).

Shared Text UIElements: The list of all the text UIElements sharing flowed text.

Shared Character Range: The range of the shared, flowed, text currently owned by a text UIElement.

It's possible for the same underlying text to flow across multiple text areas. For example, TextEdit in page mode has a different text area for each page; and, the same underlying text is distributed among them. Another example would be columns of text—each column being a separate text area with the text flowing across the columns.

In one embodiment of the present invention, each of such text areas is treated as is if it contained the entire text. For example, the "Value" attribute of the text area returns the entire text; the "Number Of Characters" attribute returns the number of characters in the entire text; character indexes are relative to the entire text, and line numbers are relative to the beginning of the entire text. However, there can be exceptions. For example, "Visible Character Range" attribute returns a value for a single text area; "Bounds For Range Parameterized" attribute only succeeds when the specified range is in the text area being queried. Attributes "Shared Text UIElements" and "Shared Character Range" can be used for finding out the details of how the flowed text is distributed.

In one embodiment of the present invention, accessibility clients obtain detailed information about text on the screen, such as font, size, line number, through accessibility API. Such detailed information is treated as attributes. However, some of these attributes involve large chunks of text; and, it is desirable to specifying a portion of the text which is of interest. For example, one can specify the position of a particular character to obtain the particular character that is on a particular line. In one embodiment of the present invention, a parameterized attribute is used so that a parameter can be used to specify a portion of the attribute when requesting the value. Thus, the attribute is parameterized; and, a parameter can be used to identify the portion of the requested attribute. For example, the parameterized attributes for describing text information may include: Line For Index, Range For Line, String For Range, Range For Position, Range For Index, Bounds For Range, RTF For Range, Style Range For Index, and others. Some of these parameterized attributes are explained below.

Line For Index: The line number which the specified character lies on.

Range For Line: The range of characters corresponding to the specified line number.

String For Range: The specified substring.

Range For Position: The range of characters composing the glyph at the specified point.

Range For Index: The full range of characters, including the specified character, which compose a single glyph.

Bounds For Range: The rectangle enclosing the specified range of characters. Note that if the range crosses a line boundary, this rectangle will fully enclose all the lines of characters.

RTF For Range: The RTF data describing the specified range of characters.

Style Range For Index: The full range of characters, including the specified character, which have the same style. It determines style runs.

Some glyphs consist of more than one character—surrogate pairs and composed characters. For example, a glyph with two accents might arise from three characters, a base character plus two accent characters. Attributes "Range For Position" and "Range For Index" specify the range of characters that comprise a single glyph. When specifying a character index or range, it is normally avoided to split multi-character glyphs.

In one embodiment of the present invention, an accessibility client can request for a list of parameterized attributes of a UIElement. For example, the list of parameterized attributes and the list of non-parameterized attributes can be requested separately. Alternatively, an accessibility client may determine if an attribute is parameterized (e.g., from the type information of the value of the attribute).

According to one embodiment of the present invention, each UIElement can have its own set of actions that can be applied to it. Note that the set can be an empty set. Typical actions are designed to be simple. For example, an action, such as "press" or "pick", corresponds to that can be applied to a user interface object through a cursor under control of a mouse to cause the application to perform a task. For example, a button or menu item would have a single action: push or pick; and, a scroll bar would have several actions: page up, page down, up one line, and down one line. The set of actions that a UIElement supports can also be obtained at run time so that no a priori knowledge about a type of user interface elements is necessary.

In one embodiment of the present invention, accessibility client applications can also register to be notified about certain events in one or more accessibility server applications (e.g., the creation of a window, or the destruction of a user interface element). For example, an observer object is first created to specify a callback function; then, the observer is added to the run-loop on which the callback will be executed; and then, the observer is registered for one or more notifications for events in one or more UIElements. In one embodiment of the present invention, a notification can be registered for various events, including: Window Created, Main Window Changed, Key Window Changed, Focused UIElement Changed, Application Activated, Application Deactivated, Application Hidden, Application Shown, UIElement Destroyed, Window Moved, Window Resized, Window Miniaturized, Window Deminiaturized, and others.

When an observer is registered for a notification, the UIElement of interested is also specified. For example, notifications associated with the whole application use the UIElement that represents the application. When the callback function is executed, the UIElement that was affected by the notification will be passed to the callback function. However, the UIElement registered with the callback routine is not always passed as the affected UIElement. For example, when a window is created, the new window is passed as the affected UIElement.

In one embodiment of the present invention, the accessibility may be selectively enabled or disabled by a user (e.g., using one of the "System Preferences" settings). To determine if the accessibility is enabled, an accessibility client can invoke an API function to examine the status of the accessibility.

In one embodiment of the present invention, accessibility clients can obtain representations of UIElements using a variety of methods provided by the accessibility API. For example, an accessibility client can request for a representation of the UIElement that represents all the applications collectively on a system; this UIElement can be used to find the focused UIElement regardless of what application is active. The accessibility client can examine the "children" attribute (or "parent", or other) of a UIElement to obtain the representation of a related UIElement. Alternatively, the accessibility client can request for a representation of a UIElement by specifying:

a) a process identification (PID) of an application for a UIElement that represents the application; or b) a position on the display screen for a UIElement that contains the position.

In one embodiment of the present invention, the accessibility API allows an accessibility client to post keyboard event to a specific application, as if the keyboard events are originated from the keyboard and directed to the specified application, regardless of whether the specified application is active or not.

In one embodiment of the present invention, the process identification (PID) of the user interface element represented by the UIElement is maintained with the representation of the UIElement. Thus, the accessibility client can determine the PID from the representation of the UIElement.

In one embodiment of the present invention, the accessibility API also provides an indication of the execution status of a request, such as: Success, Failure, Illegal Argument, Invalid UIElement, Invalid UIElement Observer, Cannot Complete, Attribute Unsupported, Action Unsupported, Notification Unsupported, Not Implemented, Parameterized Attribute Not Supported, Notification Already Registered, Notification Not Registered, API Disabled, and others.

In one embodiment of the present invention, the value of an attribute can be one of a number of different types (e.g., a point, a size, a rectangle, a range, or others). When the accessibility API retrieves the value for the accessibility client, it also retrieves the type information for the accessibility client. Thus, the accessibility API can handle different types of attribute values correctly.

Figure 4:
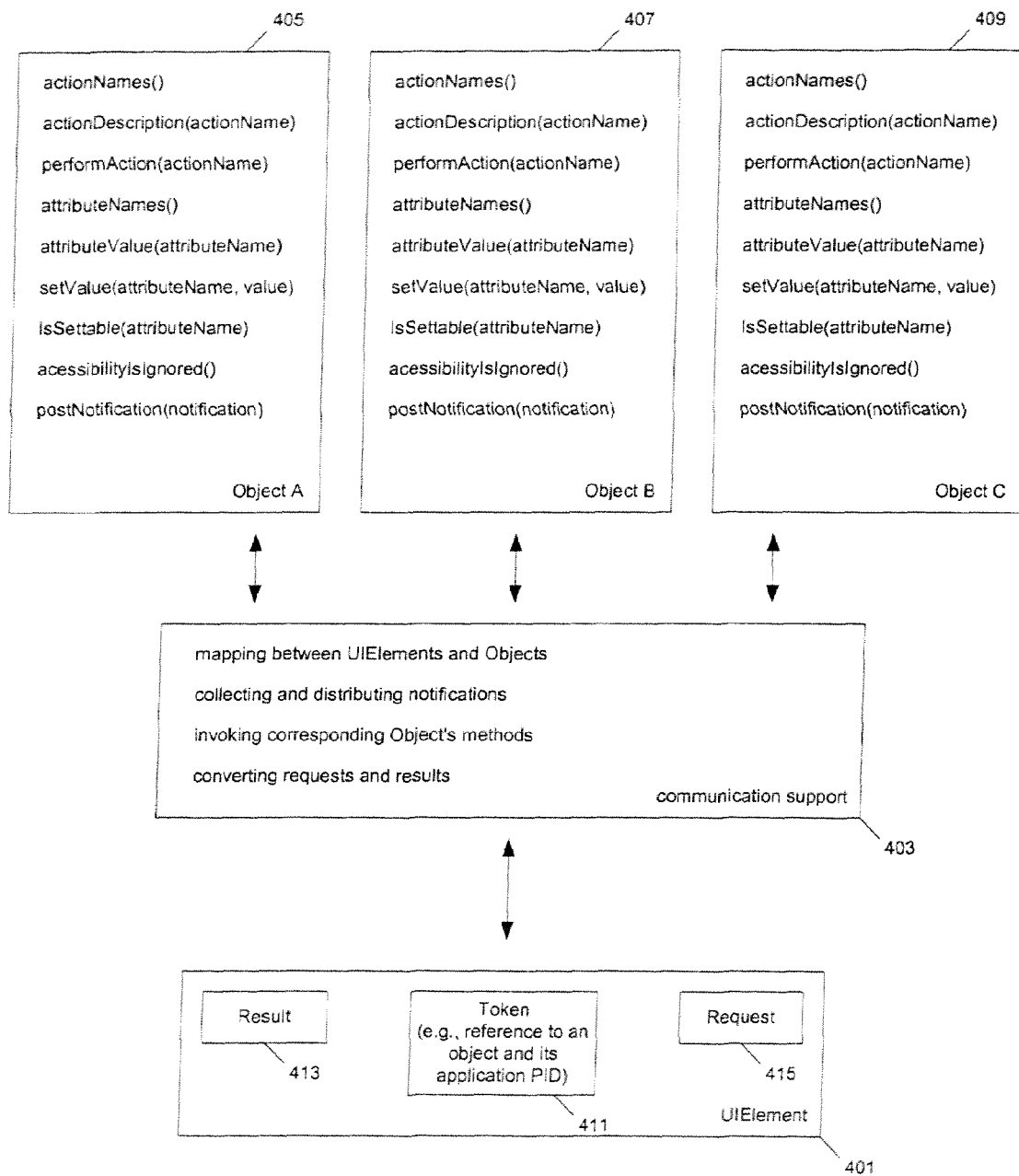
FIG. 4 illustrates a method of interfacing with a framework of user interface to provide framework independent access to the user interface objects of the framework according to one embodiment of the present invention.

FIG. 4 illustrates a method of interfacing with a framework of user interface to provide framework independent access to the user interface objects of the framework according to one embodiment of the present invention. In one embodiment of the present invention, a representation of UIElement 401 is used for the communication between the accessibility client and server. Token 411 identifies the corresponding user interface object represented by the UIElement. For example, the token may contain reference (or indication) to the object and the process identification (PID) of the accessibility server. Further, the representation of the UIElement may further contain request 415 to the accessibility server and result 413 from the accessibility server.

In one embodiment of the present invention, the UIElement support for the accessibility server contains communication support 403, which maps between the representations of the UIElements and the corresponding objects, collects and distributes notifications, invokes the corresponding user interface objects' method for the corresponding requests, and collects the results for communication to the accessibility client. In one embodiment, each class of user interface objects contains a set of methods for supporting introspection, manipulation and notification, such as methods for returning the list of actions supported, a description of an action identified by the action name, the list of attributes, the value of an attribute identified by the attribute name, the settability of an attribute identified by the attribute name, and methods for performing an operation that corresponds to an action identified by the action name, and for setting an attribute to a given value. After the object that corresponds to the UIElement is identified from the representation, the corresponding method of the object is invoked to fulfill the request.

Further, in one embodiment of the present invention, a user interface object contains a method for showing whether or not the user interface object is to be ignored from the accessibility representation. If the user interface object is to be ignored for the accessibility, no UIElement representation of the object will be passed to the accessibility client. Thus, the accessibility server can selectively hide (or expose) user interface details to accessibility clients.

In one embodiment of the present invention, accessibility support for standard widgets of a framework is provided for application developers. An accessibility server application can make use of the accessibility support to expose the structure of the user interface to the accessibility client applications with little additional code.

For example, an accessibility server application using the Cocoa widget set can use the server accessibility APIs built in the Cocoa widgets (e.g., NSApplication, NSMenu, NSMenuItem, NSView, NSControl, and NSCell) to expose the structure and details of the user interface. Accessibility supports are built in the Cocoa widgets so that little extra programming is necessary when such standard Cocoa widgets are used. However, when a custom widget is made (e.g., by implementing a subclass of a standard widget, or implementing a complete novel control or view), the custom widget needs to implement accessibility support.

In one embodiment of the present invention, each accessible user interface object of an accessibility server implements methods to support introspection, manipulation and notification. For example, methods are implemented to report the list of attribute names, to return the value of an attribute when identified by the name of the attribute, to report the list of parameterized attribute names, to return the value of a portion of a parameterized attribute when identified by a parameter and the name of the attribute, to return the settability of an attribute when identified by the name of the attribute, and to set an attribute to a given value when the attribute is identified by the name, to set a portion of a parameterized attribute when identified by a parameter (e.g., an index or a range) and the name of the attribute. Similarly, methods are implemented to report the list of attribute names, to return a description of an action when identified by its name, to perform an operation corresponding to an action when identified by the action name, and to post a notification about the event along with the identification of the object so that the notification can be distributed to registered accessibility clients.

Typically, a custom class overrides these methods to handle any new attributes they added or existing attributes for which they wish to return a different value and use the method of its super class to handle other cases (including unsupported attributes). A custom class typically starts by calling the method of its super class to get a list of inherited actions (or attributes) and then adds in any additional actions (or attributes) they support or remove any they don't support. The description of an action is typically a custom user readable (and localized in one embodiment) description for what the action does, such as "press button" or "select item."

In one embodiment of the present invention, a "hit test" method is implemented to returns the farthest descendant of the UIElement hierarchy that contains a specified point (e.g., specified in bottom-left relative screen coordinates). The "hit test" method is only called if the point has already been determined to lie within the receiver (the object that is performing the "hit test" method). Therefore, custom classes only need to override the "hit test" method to do hit testing within themselves (e.g., childless UIElements have no need to override it). For example, an NSTableView would return the cell which contains the point. If it is determined that the point lies within a child, the child gets a chance to do further hit testing. If no child contains the point, self is returned.

In one embodiment of the present invention, a "focus test" method is implemented to return the farthest descendant of the UIElement hierarchy that contains the current keyboard focus. As with the "hit test" method, the receiver (the object that is performing the "focus test" method) has already been determined to be currently focused. Therefore, custom classes only need to override the "focus test" to do focus testing within themselves (e.g., childless UIElements have no need to override it). For example, an NSTableView would return the cell which has the focus or itself if the whole table view has the focus. If it is determine that the focus lies within a child, the child gets a chance to do further focus testing. If no child has the focus, self is returned.

In one embodiment of the present invention, each accessible user interface object also contains a method to report whether or not the object is to be ignored for accessibility. Some classes that are part of the UIElement hierarchy are kept hidden from accessibility client applications. For example, it's simpler for an accessibility application to use a window with children that a user can interact with and ignore the fact that there is an intervening content view that the user cannot interact with.

Some classes, for example, NSClipView, are always ignored. Since objects of an ignored class are never available to accessibility applications, they will not be asked for their attributes or actions. However, these ignored classes still implement the attributes "Children" and "Parent" so that the accessibility support can traverse the internal hierarchy to expose the desirable structure detail to the accessibility clients.

Some classes are ignored conditionally. For example, an NSControl that is a wrapper for a single NSCell can be ignored so that only its child, the cell, is exposed to accessibility client applications. Another example is NSBox which is ignored when it's used as a separator.

Figure 5:
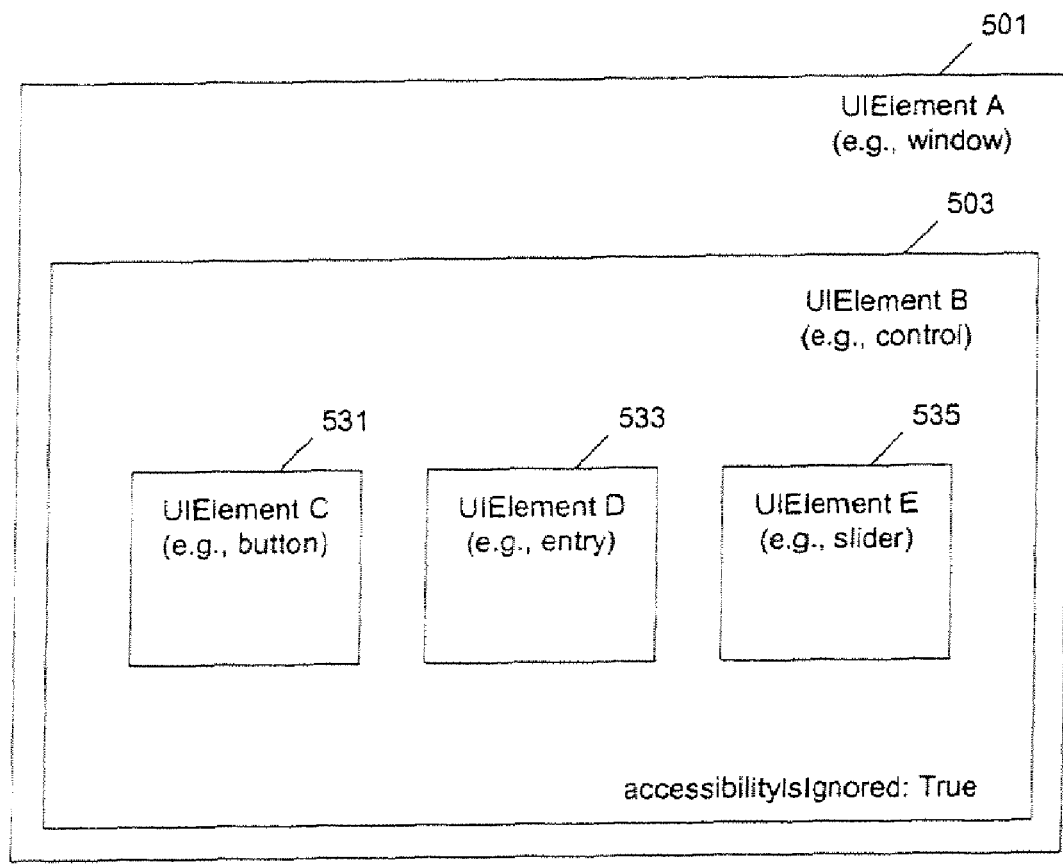
FIGS. 5-6 illustrate a method to selectively restrict accessibility according to one embodiment of the present invention.
Figure 6:
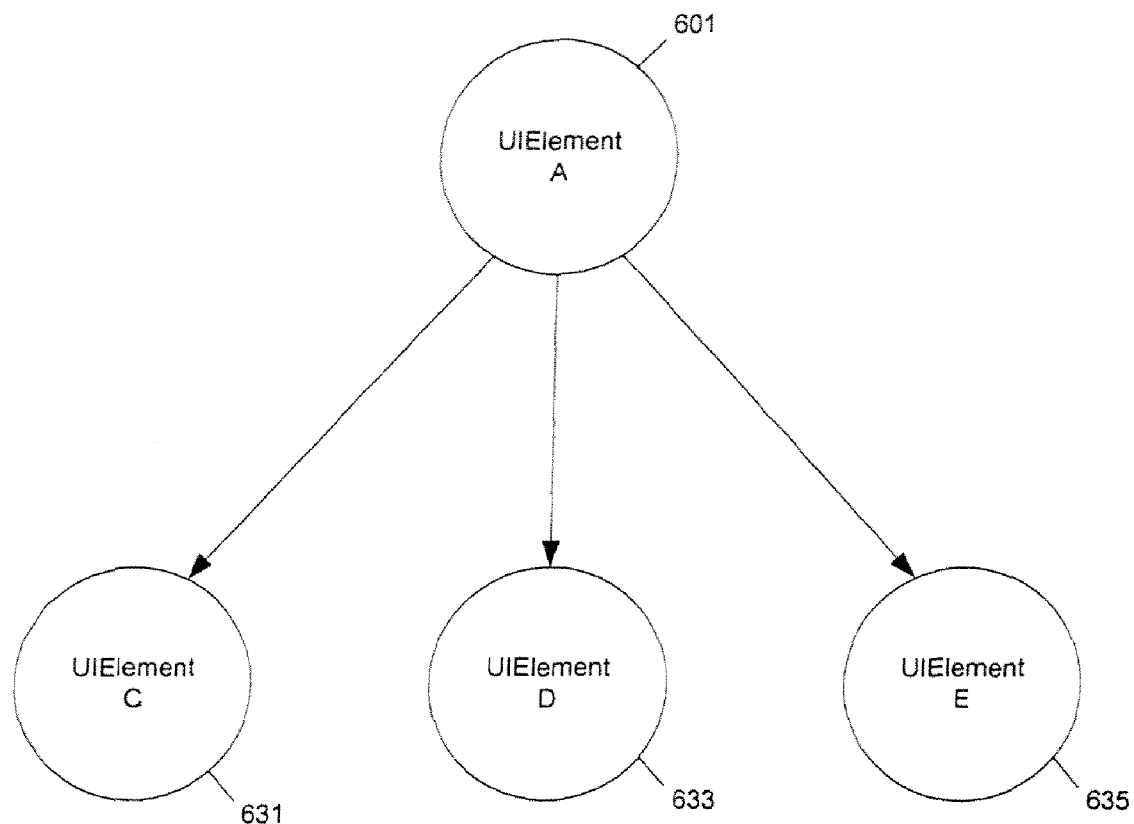

FIGS. 5-6 illustrate a method to selectively restrict accessibility according to one embodiment of the present invention. In FIG. 5, object 501 contains object 503, which contains objects 531, 533 and 535. The parent-child relations generally follow the rule that the parent contains the child and the child is contained within the parent according to the implementation of the graphical user interface. In the graphical user interface, object 503 is for the placement of objects 531, 533 and 535 within object 501. Thus, object 503 is in general not of interest to accessibility clients. Therefore, the accessibility server can indicate that object 503 is to be ignored for accessibility. In determining the children of object 501, whether or not object 503 is to be ignored is checked. Since object 503 is to be ignored, it is removed from the list of children of object 501; and, the children of object 503 are added to the list of children of object 501. Only those that are not to be ignored are returned as the children of object 501. A similar process is used in identifying the parent of an object for accessibility. Thus, the hierarchy of user interface elements presented to the accessibility clients is as shown in FIG. 6, in which there is no indication of the existence of object 503. In FIG. 6, UIElement 601 corresponds to object 501; and, UIElements 631, 533 and 635 correspond to objects 531, 533 and 535 respectively. Thus, unnecessary details about the structure of the user interface objects in the accessibility server are hidden from the accessibility clients.

Alternatively, the user interface objects can explicitly specify their children and parents for the accessibility clients, instead of relying on the object hierarchy that is used in implementing the user interface of the accessibility server. Further, a UIElement does not have to correspond to a widget; a UIElement can be use to represent a helper object which exposes user interface structure suitable for accessibility clients. Thus, the accessibility server can have the flexibility to express the user interface structure suitable for accessibility clients without having to literally expose its own user interface structure.

In one embodiment of the present invention, certain user interface elements have non-view children (cells) which are unable to implement the accessibility protocol by themselves. For example, a cell doesn't know its position. To enable these children, the parent implements methods to help these children. For example, the parent provides the size of a child, the position of the child, a help string for the child, an indication of whether the child is focusable; and, the parent can post keyboard event to the child and set focus for the child. When the child needs help, it can call the parent to obtain the information or perform the corresponding task.

Figure 7:
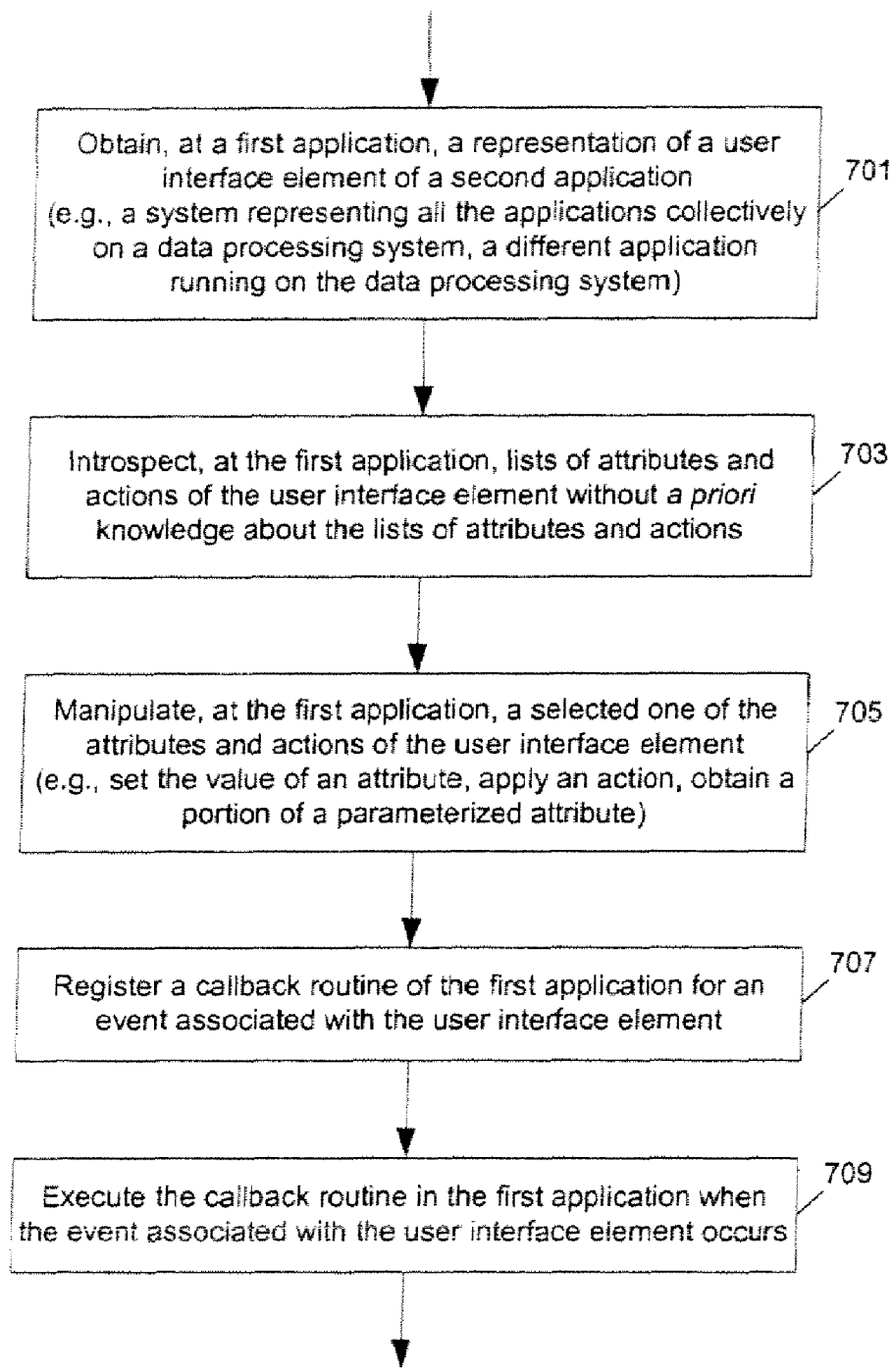
FIG. 7 shows a method to access user interface elements across applications according to one embodiment of the present invention.

FIG. 7 shows a method to access user interface elements across applications according to one embodiment of the present invention. Operation 701 obtains, at a first application, a representation of a user interface element of a second application (e.g., a system representing all the applications collectively on a data processing system, a different application running on the data processing system). Operation 703 introspects, at the first application, lists of attributes and actions of the user interface element without a priori knowledge about the lists of attributes and actions. Operation 705 manipulates, at the first application, a selected one of the attributes and actions of the user interface element (e.g., set the value of an attribute, apply an action, obtain a portion of a parameterized attribute). Operation 707 registers a callback routine of the first application for an event associated with the user interface element in the second application. Operation 709 executes the callback routine in the first application when the event associated with the user interface element occurs in the second application.

Figure 8:
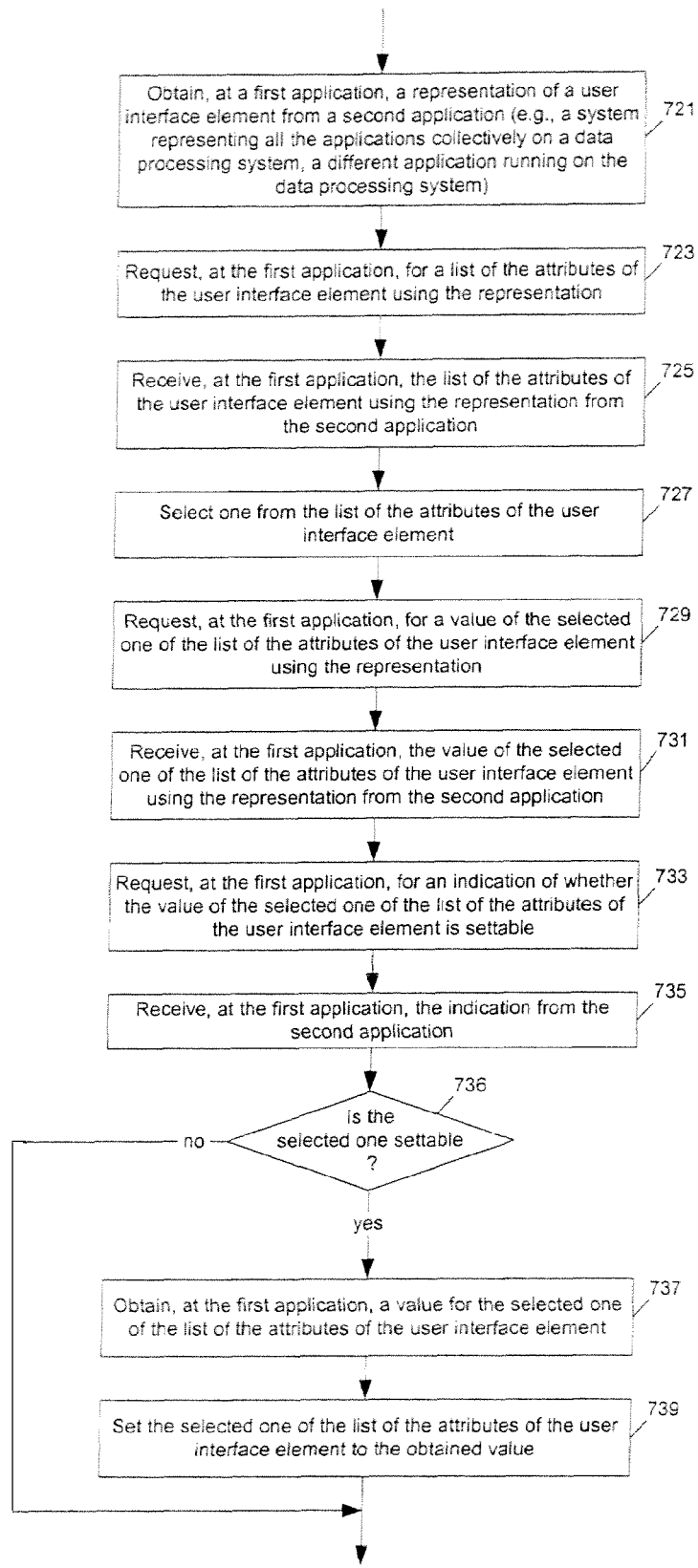
FIG. 8 shows a method to access attributes of a user interface element according to one embodiment of the present invention.

FIG. 8 shows a method to access attributes of a user interface element according to one embodiment of the present invention. Operation 721 obtains, at a first application, a representation of a user interface element of a second application (e.g., a system representing all the applications collectively on a data processing system, a different application running on the data processing system). Operation 723 requests, at the first application, for a list of the attributes of the user interface element using the representation. Operation 725 receives, at the first application, the list of the attributes of the user interface element using the representation from the second application. Operation 727 selects one from the list of the attributes of the user interface element. Operation 729 requests, at the first application, for a value of the selected one of the list of the attributes of the user interface element using the representation. Operation 731 receives, at the first application, the value of the selected one of the list of the attributes of the user interface element using the representation from the second application. Operation 733 requests, at the first application, for an indication of whether the value of the selected one of the list of the attributes of the user interface element is settable. Operation 735 receives, at the first application, the indication from the second application. If operation 736 determines that the selected is one settable, operation 737 obtains, at the first application, a value for the selected one of the list of the attributes of the user interface element; and, operation 739 sets the selected one of the list of the attributes of the user interface element to the obtained value.

Figure 9:
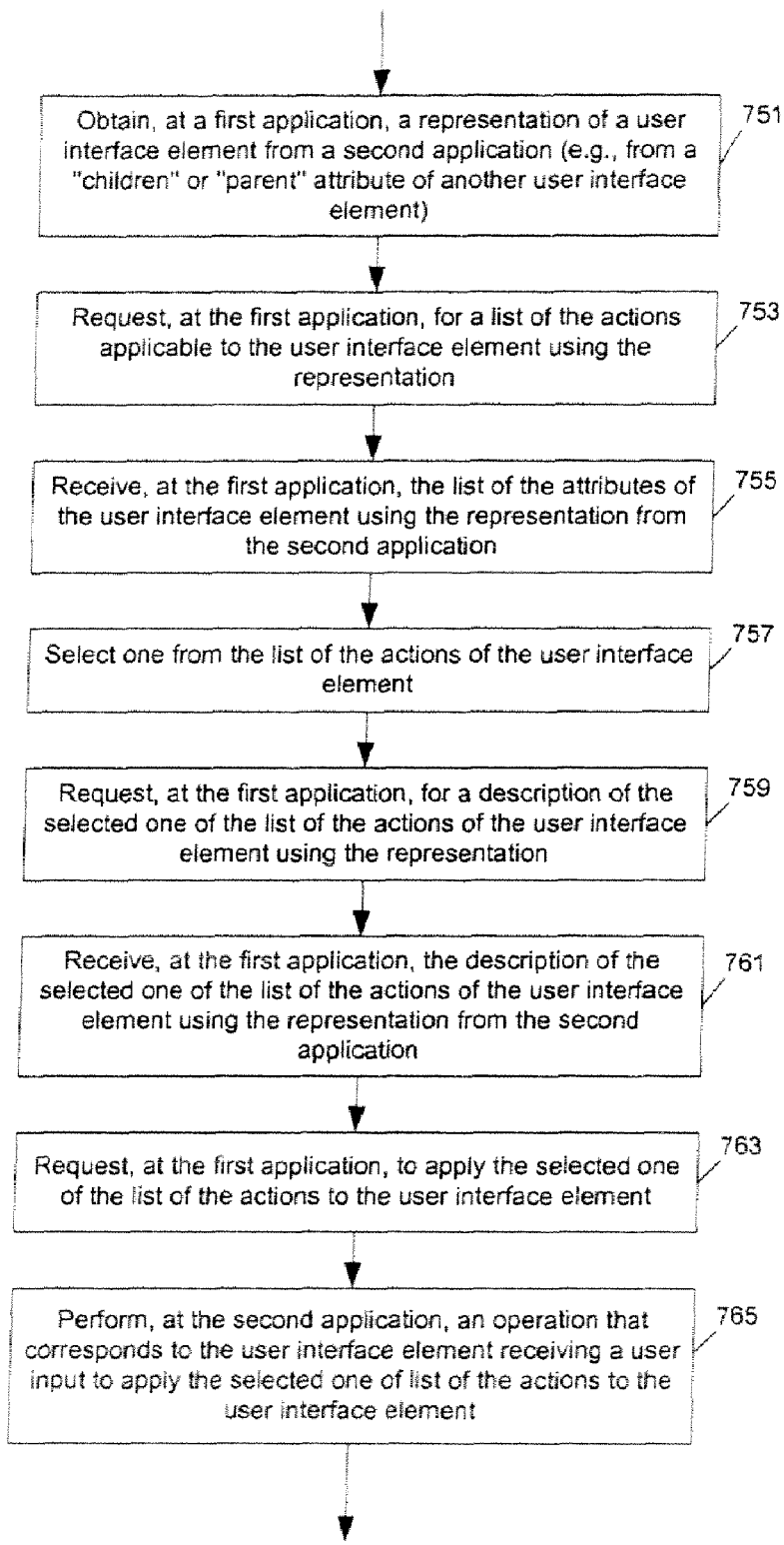
FIG. 9 shows a method to access actions applicable to a user interface element according to one embodiment of the present invention.

FIG. 9 shows a method to access actions applicable to a user interface element according to one embodiment of the present invention. Operation 751 obtains, at a first application, a representation of a user interface element from a second application (e.g., from a "children" or "parent" attribute of another user interface element). Operation 753 requests, at the first application, for a list of the actions applicable to the user interface element using the representation. Operation 755 receives, at the first application, the list of the attributes of the user interface element using the representation from the second application. Operation 757 selects one from the list of the actions of the user interface element. Operation 759 requests, at the first application, for a description of the selected one of the list of the actions of the user interface element using the representation. Operation 761 receives, at the first application, the description of the selected one of the list of the actions of the user interface element using the representation from the second application. Operation 763 requests, at the first application, to apply the selected one of the list of the actions to the user interface element. Operation 765 performs, at the second application, an operation that corresponds to the user interface element receiving a user input to apply the selected one of list of the actions to the user interface element.

Figure 10:
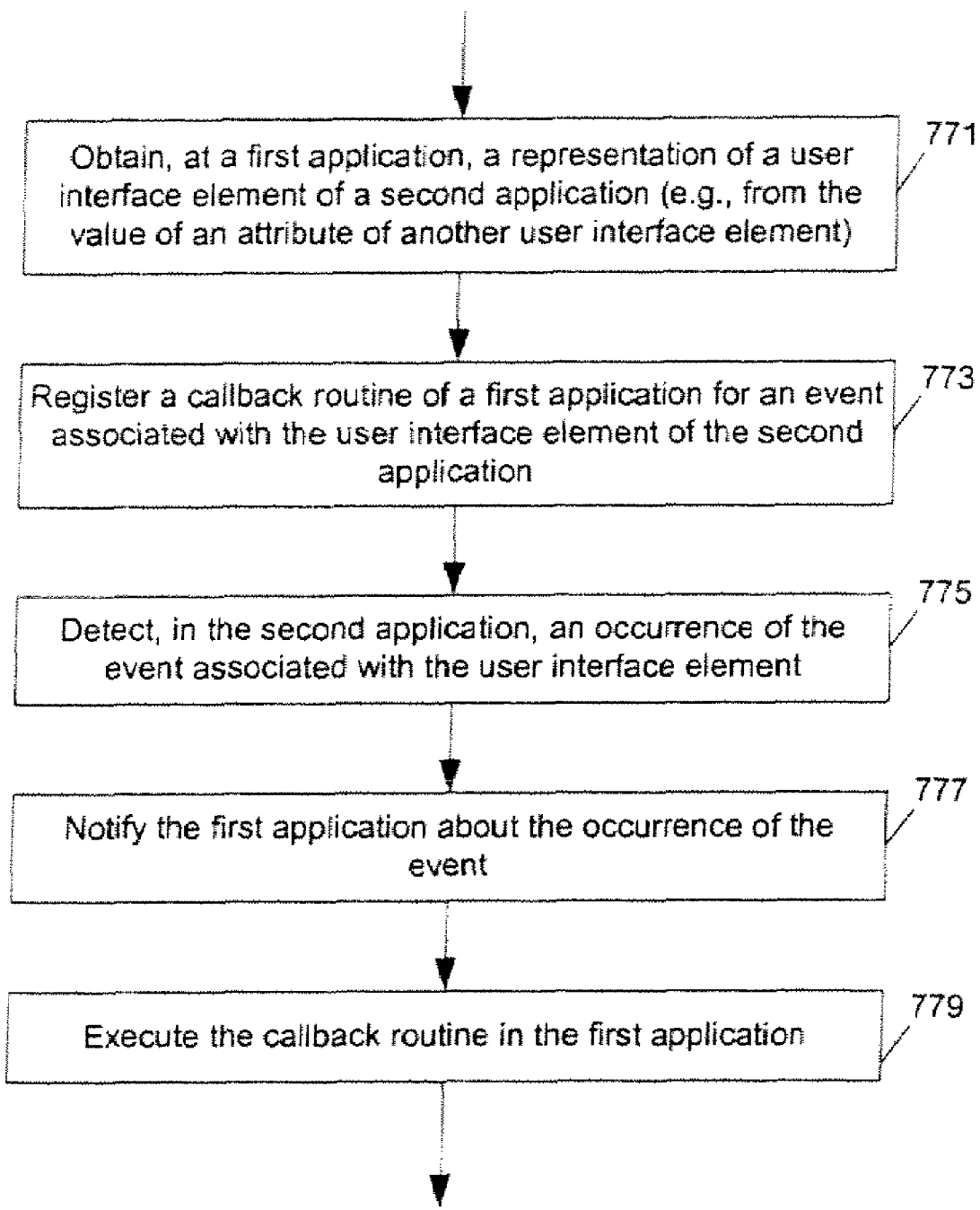
FIG. 10 shows a method to provide inter-application event notification according to one embodiment of the present invention.

FIG. 10 shows a method to provide inter-application event notification according to one embodiment of the present invention. Operation 771 obtains, at a first application, a representation of a user interface element of a second application (e.g., from the value of an attribute of another user interface element). Operation 773 registers a callback routine of a first application for an event associated with the user interface element of the second application. Operation 775 detects, in the second application an occurrence of the event associated with the user interface element. Operation 777 notifies the first application about the occurrence of the event. Operation 779 executes the callback routine in the first application.

Figure 11:
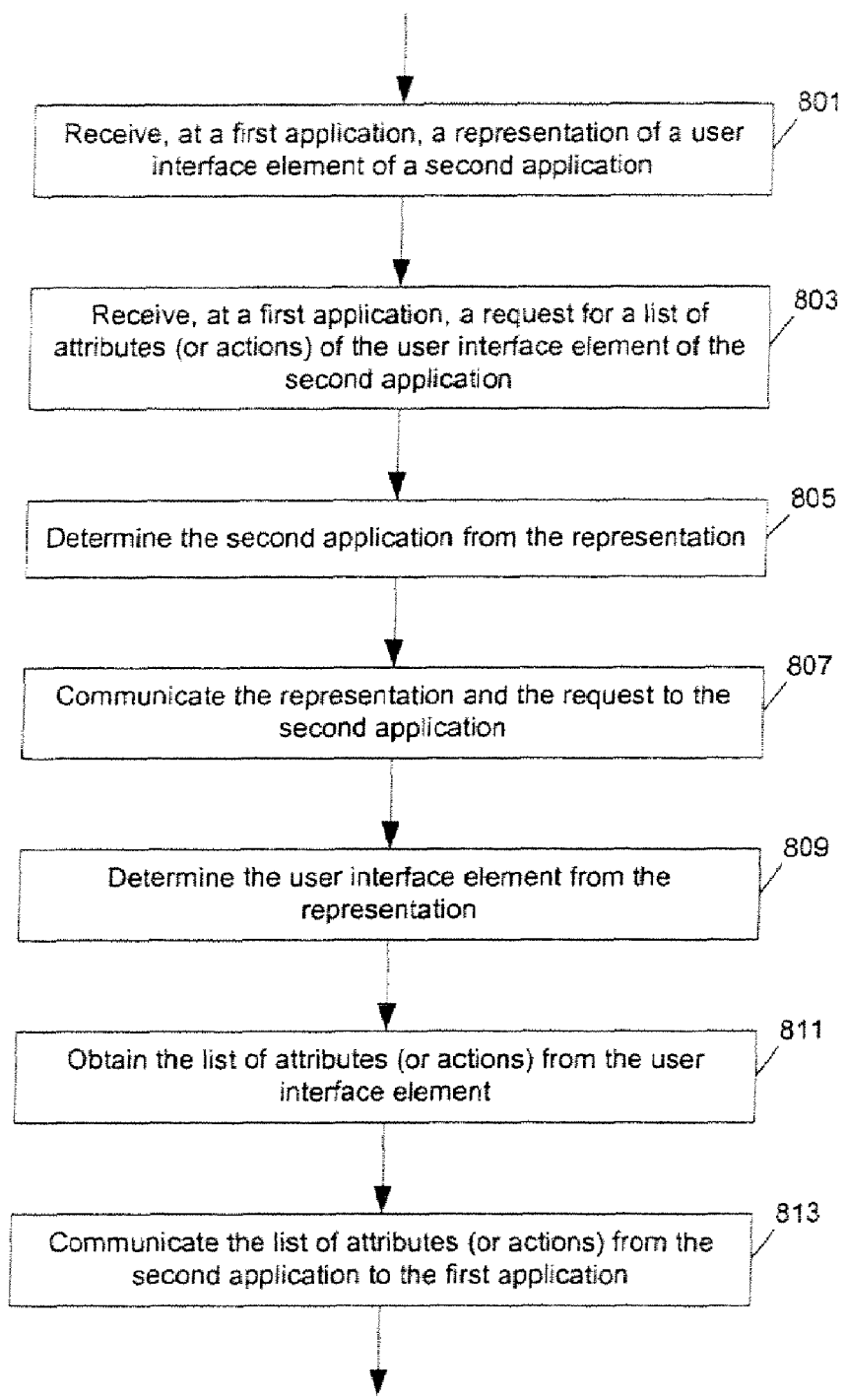
FIG. 11 shows a method to interface with a framework of user interface to provide framework independent access to the user interface objects of the framework according to one embodiment of the present invention.

FIG. 11 shows a method to interface with a framework of user interface to provide framework independent access to the user interface objects of the framework according to one embodiment of the present invention. Operation 801 receives, at a first application, a representation of a user interface element of a second application. Operation 803 receives, at a first application, a request for a list of attributes (or actions) of the user interface element of the second application. Operation 805 determines the second application from the representation. Operation 807 communicates the representation and the request to the second application. Operation 809 determines the user interface element from the representation. Operation 811 obtains the list of attributes (or actions) from the user interface element. Operation 813 communicates the list of attributes (or actions) from the second application to the first application.

Figure 12:
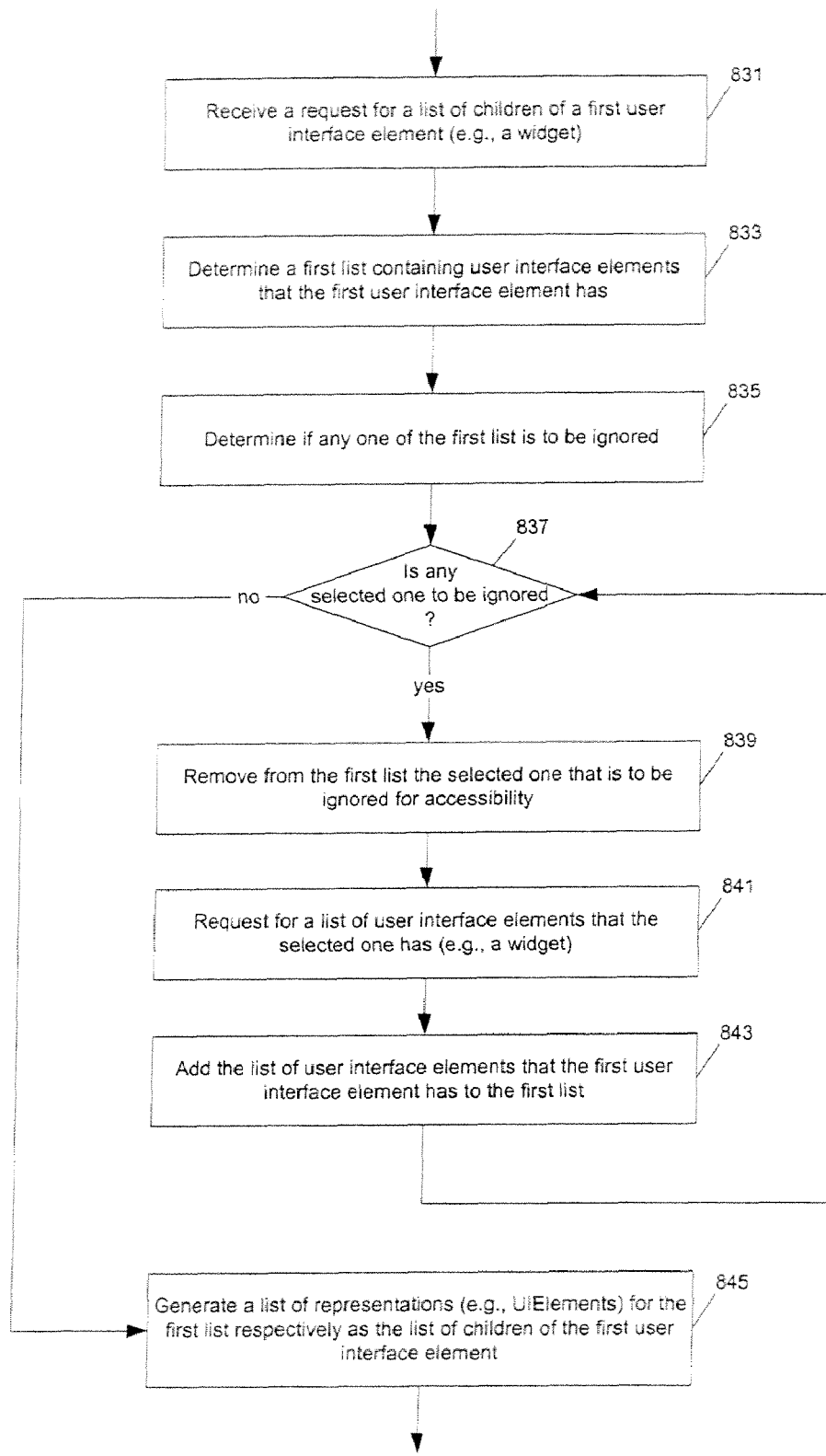
FIG. 12 shows a method to provide selective accessibility according to one embodiment of the present invention.

FIG. 12 shows a method to provide selective accessibility according to one embodiment of the present invention. Operation 831 receives a request for a list of children of a first user interface element (e.g., a widget). Operation 833 determines a first list containing user interface elements that the first user interface element has. Operation 835 determines if any one of the first list is to be ignored. If operation 837 determines that none of the first list is to be ignored, operation 845 generates a list of representations (e.g., UIElements) for the first list respectively as the list of children of the first user interface element; otherwise, operation 839 removes from the first list the selected one that is to be ignored for accessibility. Operation 841 requests for a list of user interface elements that the selected one has (e.g., a widget). Operation 843 adds the list of user interface elements that the first user interface element has to the first list. Operations 839-943 are repeated until none of the first list is labeled as to be ignored for accessibility.

Although the operations in the above examples are illustrated in specific sequences, from this description, it will be appreciated that various different operation sequences and variations can be used without having to be limited to the above illustrated examples.

Although, when displayed, some user interface elements (e.g., a window, a button, or others) of an accessibility server has a graphical representation, or a text representation, on a display screen, some user interface elements (e.g., a frame) may not have a corresponding graphical (or text) representation on the display screen. Some user interface elements contain the information about a user interface, which may be of interest to an accessibility client; and, some user interface elements manage other user interfaces (e.g., for laying out buttons within a frame). Some user interface elements have an audio representation but not a visible representation on the display screen. Some user interface elements may not directly noticeable to a user. UIElements can represent these user interface elements according to embodiments of the present invention to provide accessibility. Some UIElements have both lists of attributes and actions; and, some UIElements have no lists of actions.

Further, from this description, it is understood that a UIElement may not exactly correspond to a user interface object of an accessibility server in one embodiment of the present invention. For example, a UIElement may represent a collection of user interface objects of an accessibility server but selectively hide certain aspects of the collection of the user interface objects (e.g., relied on collection of the user interfaces objects to perform its actions or gather attribute information); a UIElement may represent a collection of information (e.g., a document with a URL (uniform resource locator, or universal resource locator)); a UIElement may represent a collection of application processes (e.g., all visible applications on a screen, all miniaturized applications on a screen, all applications running on a system, or others). In one embodiment of the present invention, each UIElement has at least a parent attribute or a children (child) attribute so that from one UIElement one can traverse the entry hierarchy of UIElements. In one embodiment of the present invention, a UIElement can represent a virtual user interface element (e.g., all the applications running on a system), which does not have a single corresponding application process. In one embodiment, the library code of the client side API performs the operations to manipulate a UIElement that represents the virtual user interface element (the UIElement that represents all the applications on a system); and, in another embodiment, a special application process is maintained on the system to perform the corresponding operations.

Further, in one embodiment of the present invention, UIElements are used to represent general elements for inter-application accessibility. In additional to the accessibility aids, automated testing tools, computer-based training applications and others can also use the accessibility to control other application programs, through the user interfaces of the application programs or through other interfaces (e.g., scripting interfaces) of the application programs. For example, the elements of the accessibility servers, in one embodiment, correspond to elements of an inter-process communication interface; an accessibility client may access the accessibility servers through methods of the present invention for a user to build an automated test (e.g., through a graphical user interface controlled by the accessibility client) for testing the communication interface of the accessibility servers.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for a first application process to access a user interface element, the method comprising:
   obtaining, at the first application process, a representation of the user interface element, the first application process maintaining the representation of the user interface element without a priori knowledge of a list of named identifiers separately identifying a list of actions applicable to the user interface element;
   retrieving, at the first application process and from a second application process, the list of named identifiers identifying the list of actions applicable to the user interface element, a first named identifier of the list of named identifiers identifying a first action of the list of actions; and
   selecting the first named identifier to apply the first action on the user interface element via the second application process.

2. A method as in claim 1, wherein the user interface element is a portion of the second application process.

3. A method as in claim 2, further comprising:
   requesting, at the first application process, to perform an operation in the second application process, the operation corresponding to the first action of the list of actions being applied to the user interface element.

4. A method as in claim 2, further comprising:
   retrieving, at the first application process and from the second application process, a description of the first action.

5. A method as in claim 2, further comprising:
   determining the second application process from the representation of the user interface element.

6. A method as in claim 2, wherein the representation of the user interface element is obtained at the first application process by specifying one of:
   a) a position on a display screen;
   b) an identification of the second application process; and
   c) an attribute of a user interface element.

7. A method as in claim 1, further comprising:
   retrieving, at the first application process, a value for an attribute of an action from the list of actions.

8. A method as in claim 1, further comprising:
   setting, at the first application process, a value for an attribute of an action from the list of actions to a specified value.

9. A method as in claim 1, further comprising:
   registering, at the first application process, a callback routine for an event associated with the user interface element.

10. A method as in claim 1, further comprising:
    invoking, at the first application process, a callback routine for an event associated with the user interface element when the event occurs.

11. A method as in claim 1, further comprising:
    performing, at the second application process, an operation identified by a name of an action from the list of actions.

12. A method to provide accessibility, the method comprising:
    receiving, at a first application process, a request for a list of actions applicable to a user interface element, the request including a representation of the user interface element, wherein the first application process maintains the representation of the user interface element without a priori knowledge of a list of named identifiers separately identifying the list of actions;
    communicating the request for the list of actions to a second application process;
    obtaining, at the second application process, the list of named identifiers identifying the list of actions applicable to the user interface element, a first named identifier of the list of named identifier identifying a first action of the list of actions; and
    communicating the list of named identifiers from the second application process to the first application process to cause the first named identifier to be selected for application of the first action on the user interface element via the second application process.

13. A method as in claim 12, further comprising:
    receiving, at the first application process, a request to perform an operation in the second application process, the operation being specified by the first action of the list of actions;
    communicating the request to perform the operation that is specified by the first action; and
    causing the operation to be performed in the second application process.

14. A method as in claim 12, wherein the user interface element is a portion of the second application process.

15. A method as in claim 14, further comprising:
    determining the second application process from a representation of the user interface element at the first application process.

16. A method as in claim 15, wherein the representation of the user interface element is obtained at the first application process by specifying one of:
    a) a position on a display screen;
    b) an identification of the second application process; and
    c) an attribute of a user interface element.

17. A method as in claim 15, further comprising:
determining the user interface element from the representation.

18. A method as in claim 17, further comprising:
determining an operation from the first action in the second application process.

19. A method as in claim 12, further comprising:
retrieving, at the first application process, a value for an attribute of an action from the list of actions.

20. A method as in claim 12, further comprising:
setting, at the first application process, a value for an attribute of an action from the list of actions to a specified value.

21. A method as in claim 12, further comprising:
registering, at the first application process, a callback routine for an event associated with the user interface element.

22. A method as in claim 12, further comprising:
invoking, at the first application process, a callback routine for an event associated with the user interface element when the event occurs.

23. A method as in claim 12, further comprising:
performing, at the second application process, an operation identified by a name of an action from the list of actions.

24. A machine readable storage medium containing executable computer program instructions which when executed by a data processing system cause said system to perform a method for a first application process to access a user interface element, the method comprising:
obtaining, at the first application process, a representation of the user interface element, the first application process maintaining the representation of the user interface element without a priori knowledge of a list of named identifiers separately identifying a list of actions applicable to the user interface element;
retrieving, at the first application process and from a second application process, the list of named identifiers identifying the list of actions applicable to the user interface element, a first named identifier of the list of named identifiers identifying a first action of the list of actions; and
selecting the first named identifier to apply the first action on the user interface element via the second application process.

25. A medium as in claim 24, wherein the user interface element is a portion of the second application process.

26. A medium as in claim 25, wherein the method further comprises:
requesting, at the first application process, to perform an operation in the second application process, the operation corresponding to the first action of the list of actions being applied to the user interface element.

27. A medium as in claim 25, wherein the method further comprises:
retrieving, at the first application process and from the second application process, a description of the first action.

28. A medium as in claim 25, wherein the method further comprises:
determining the second application process from the representation of the user interface element.

29. A medium as in claim 25, wherein the representation of the user interface element is obtained at the first application process by specifying one of:
a) a position on a display screen;
b) an identification of the second application process; and
c) an attribute of a user interface element.

30. A medium as in claim 24, wherein the method further comprises:
retrieving, at the first application process, a value for an attribute of an action from the list of actions.

31. A medium as in claim 24, wherein the method further comprises:
setting, at the first application process, a value for an attribute of an action from the list of actions to a specified value.

32. A medium as in claim 24, wherein the method further comprises:
registering, at the first application process, a callback routine for an event associated with the user interface element.

33. A medium as in claim 24, wherein the method further comprises:
invoking, at the first application process, a callback routine for an event associated with the user interface element when the event occurs.

34. A medium as in claim 24, wherein the method further comprises:
performing, at the second application process, an operation identified by a name of an action from the list of actions.

35. A machine readable storage medium containing executable computer program instructions which when executed by a data processing system cause said system to perform a method to provide accessibility, the method comprising:
receiving, at a first application process, a request for a list of actions applicable to a user interface element, the request including a representation of the user interface element, wherein the first application process maintains the representation of the user interface element without a priori knowledge of a list of named identifiers separately identifying the list of actions;
communicating the request for the list of actions to a second application process;
obtaining, at the second application process, the list of named identifiers identifying the list of actions applicable to the user interface element, a first named identifier of the list of named identifier identifying a first action of the list of actions; and
communicating the list of named identifiers from the second application process to the first application process to cause the first named identifier to be selected for application of the first action on the user interface element via the second application process.

36. A medium as in claim 35, wherein the method further comprises:
receiving, at the first application process, a request to perform an operation in the second application process, the operation being specified by the first action of the list of actions;
communicating the request to perform the operation that is specified by the first action; and
causing the operation to be performed in the second application process.

37. A medium as in claim 35, wherein the user interface element is a portion of the second application process.

38. A medium as in claim 37, wherein the method further comprises:
determining the second application process from a representation of the user interface element at the first application process.

39. A medium as in claim 38, wherein the representation of the user interface element is obtained at the first application process by specifying one of:
   a) a position on a display screen;
   b) an identification of the second application process; and
   c) an attribute of a user interface element.

40. A medium as in claim 38, wherein the method further comprises:
   determining the user interface element from the representation.

41. A medium as in claim 40, wherein the method further comprises:
   determining an operation from the first action in the second application process.

42. A medium as in claim 35, wherein the method further comprises:
   retrieving, at the first application process, a value for an attribute of an action from the list of actions.

43. A medium as in claim 35, wherein the method further comprises:
   setting, at the first application process, a value for an attribute of an action from the list of actions to a specified value.

44. A medium as in claim 35, wherein the method further comprises:
   registering, at the first application process, a callback routine for an event associated with the user interface element.

45. A medium as in claim 35, wherein the method further comprises:
   invoking, at the first application process, a callback routine for an event associated with the user interface element when the event occurs.

46. A medium as in claim 35, wherein the method further comprises:
   performing, at the second application process, an operation identified by a name of an action from the list of actions.

47. A data processing system for a first application process to access a user interface element, the data processing system comprising:
   means for obtaining, at the first application process, a representation of the user interface element, the first application process maintaining the representation of the user interface element without a priori knowledge of a list of named identifiers separately identifying a list actions applicable to the user interface element;
   means for retrieving, at the first application process and from a second application process, the list of named identifiers identifying the list of actions applicable to the user interface element, a first named identifier of the list of named identifiers identifying a first action of the list of actions; and
   selecting the first named identifier to apply the first action on the user interface element via the second application process.

48. A data processing system as in claim 47, wherein the user interface element is a portion of the second application process.

49. A data processing system as in claim 48, further comprising:
   means for requesting, at the first application process, to perform an operation in the second application process, the operation corresponding to the first action of the list of actions being applied to the user interface element.

50. A data processing system as in claim 48, further comprising:
   means for retrieving, at the first application process and from the second application process, a description of the first action.

51. A data processing system as in claim 48, further comprising:
   means for determining the second application process from the representation of the user interface element.

52. A data processing system as in claim 48, wherein the representation of the user interface element is obtained at the first application process by specifying one of:
   a) a position on a display screen;
   b) an identification of the second application process; and
   c) an attribute of a user interface element.

53. A data processing system as in claim 47, further comprising:
   means for retrieving, at the first application process, a value for an attribute of an action from the list of actions.

54. A data processing system as in claim 47, further comprising:
   means for setting, at the first application process, a value for an attribute of an action from the list of actions to a specified value.

55. A data processing system as in claim 47, further comprising:
   means for registering, at the first application process, a callback routine for an event associated with the user interface element.

56. A data processing system as in claim 47, further comprising:
   means for invoking, at the first application process, a callback routine for an event associated with the user interface element when the event occurs.

57. A data processing system as in claim 47, further comprising:
   means for performing, at the second application process, an operation identified by a name of an action from the list of actions.

58. A data processing system to provide accessibility, the data processing system comprising:
   means for receiving, at a first application process, a request for a list of actions applicable to a user interface element, the request including a representation of the user interface element, wherein the first application process maintains the representation of the user interface element without a priori knowledge of a list of named identifiers separately identifying the list of actions;
   means for communicating the request for the list of actions to a second application process;
   means for obtaining, at the second application process, the list of named identifiers identifying the list of actions applicable to the user interface element, a first named identifier of the list of named identifier identifying a first action of the list of actions; and
   means for communicating the list of named identifiers from the second application process to the first application process to cause the first named identifier to be selected for application of the first action on the user interface element via the second application process.

59. A data processing system as in claim 58, further comprising:
   means for receiving, at the first application process, a request to perform an operation in the second application process, the operation being specified by the first action of the list of actions;

means for communicating the request to perform the operation that is specified by the first action; and means for causing the operation to be performed in the second application process.

60. A data processing system as in claim 58, wherein the user interface element is a portion of the second application process.

61. A data processing system as in claim 60, further comprising:

means for determining the second application process from a representation of the user interface element at the first application process.

62. A data processing system as in claim 61, wherein the representation of the user interface element is obtained at the first application process by specifying one of:

a) a position on a display screen;
b) an identification of the second application process; and
c) an attribute of a user interface element.

63. A data processing system as in claim 61, further comprising:

means for determining the user interface element from the representation.

64. A data processing system as in claim 63, further comprising:

means for determining an operation from the first action in the second application process.

65. A data processing system as in claim 58, further comprising:

means for retrieving, at the first application process, a value for an attribute of an action from the list of actions.

66. A data processing system as in claim 58, further comprising:

means for setting, at the first application process, a value for an attribute of an action from the list of actions to a specified value.

67. A data processing system as in claim 58, further comprising:

means for registering, at the first application process, a callback routine for an event associated with the user interface element.

68. A data processing system as in claim 58, further comprising:

means for invoking, at the first application process, a callback routine for an event associated with the user interface element when the event occurs.

69. A data processing system as in claim 58, further comprising:

means for performing, at the second application process, an operation identified by a name of an action from the list of actions.

* * * * *

UNITED STATES PATENT AND TRADEMARK OFFICE
CERTIFICATE OF CORRECTION

| | | |
|---|---|---|
| PATENT NO. | : 7,900,215 B2 | Page 1 of 1 |
| APPLICATION NO. | : 12/253185 | |
| DATED | : March 1, 2011 | |
| INVENTOR(S) | : Michael Scott Engber et al. | |

It is certified that error appears in the above-identified patent and that said Letters Patent is hereby corrected as shown below:

On the Title Pg, Item (56), under "Other Publications", line 3,
delete "Micrsoft" and insert -- Microsoft --, therefor.

In column 6, line 20, delete "input output" and insert -- input/output --, therefor.

In column 6, line 21, delete "input output" and insert -- input/output --, therefor.

In column 10, line 61, after "enabled)" insert -- . --.

In column 17, line 59, after "application" insert -- , --.

In column 23, line 47, in claim 47, after "list" insert -- of --.

Signed and Sealed this
Eighth Day of November, 2011

David J. Kappos
*Director of the United States Patent and Trademark Office*